United States Patent [19]

Sheffer et al.

[11] Patent Number: 5,218,367
[45] Date of Patent: Jun. 8, 1993

[54] VEHICLE TRACKING SYSTEM

[75] Inventors: Eliezer A. Sheffer; Marco J. Thompson, both of San Diego, Calif.

[73] Assignee: Trackmobile, San Diego, Calif.

[21] Appl. No.: 891,805

[22] Filed: Jun. 1, 1992

[51] Int. Cl.$^5$ .................. G01S 3/02; H04M 11/00
[52] U.S. Cl. ........................................ 342/457; 379/59
[58] Field of Search ............... 342/457, 463; 455/33.1; 379/58, 59, 63

[56] References Cited

U.S. PATENT DOCUMENTS

| | | | |
|---|---|---|---|
| 2,204,438 | 6/1940 | Neufeld | 250/2 |
| 2,922,142 | 1/1960 | Lappin | 340/150 |
| 3,018,475 | 1/1962 | Kleist et al. | 343/6.8 |
| 3,058,106 | 10/1962 | Cutler | 343/100 |
| 3,137,854 | 6/1964 | Anderson | 343/112 |
| 3,357,020 | 12/1967 | Slifer, Jr. | 343/100 |
| 3,419,865 | 12/1968 | Chisholm | 343/112 |
| 3,518,674 | 6/1970 | Moorehead et al. | 343/112 |
| 3,531,801 | 9/1970 | Huebscher | 343/15 |
| 3,680,121 | 7/1972 | Anderson et al. | 343/112 |
| 3,694,579 | 9/1972 | McMurray | 179/5 R |
| 3,793,635 | 2/1974 | Potter | 343/112 |
| 3,828,306 | 8/1974 | Angeloni | 340/32 |
| 3,848,254 | 11/1974 | Drebinger et al. | 343/112 |
| 3,886,553 | 5/1975 | Bates | 343/112 |
| 3,922,678 | 11/1975 | Frenkel | 343/112 |
| 3,947,807 | 3/1976 | Tyler et al. | 340/23 |
| 3,997,868 | 12/1976 | Ribnick et al. | 340/33 |
| 4,101,873 | 7/1978 | Anderson et al. | 340/539 |
| 4,112,421 | 9/1978 | Freeny, Jr. | 343/112 |
| 4,139,889 | 2/1979 | Ingels | 364/460 |
| 4,152,693 | 5/1979 | Ashworth, Jr. | 340/24 |
| 4,177,466 | 12/1979 | Reagan | 343/112 |
| 4,187,497 | 2/1980 | Howell et al. | 340/65 |
| 4,209,787 | 6/1980 | Freeny, Jr. | 343/112 |
| 4,247,846 | 1/1981 | Zedler | 340/523 |
| 4,369,426 | 1/1983 | Merkel | 340/32 |
| 4,475,010 | 10/1984 | Huensch et al. | 179/2 EB |
| 4,494,119 | 1/1985 | Wimbush | 33/457 |
| 4,577,182 | 3/1986 | Millsap et al. | 340/539 |
| 4,596,988 | 6/1986 | Wanka | 343/457 |
| 4,651,157 | 3/1987 | Gray et al. | 342/457 |
| 4,740,792 | 4/1988 | Sagey et al. | 342/457 |
| 4,891,650 | 1/1990 | Sheffer | 342/457 |
| 4,907,290 | 3/1990 | Crompton | 455/33.1 |
| 5,055,851 | 10/1991 | Sheffer | 342/457 |
| 5,121,126 | 6/1992 | Clagett | 379/59 X |

FOREIGN PATENT DOCUMENTS

| | | |
|---|---|---|
| 0011444 | 5/1980 | European Pat. Off. . |
| 0242099 | 10/1987 | European Pat. Off. . |
| 2016770 | 9/1979 | United Kingdom . |
| 2207787 | 2/1989 | United Kingdom . |

Primary Examiner—Mark Hellner
Attorney, Agent, or Firm—Brown, Martin, Haller & McClain

[57] ABSTRACT

A vehicle tracking system makes use of a conventional cellular telephone network including a plurality of fixed cellular transmitter sites each covering a predetermined area. The system includes a plurality of cellular signal processing units for installation at hidden locations in vehicles to be monitored. Each unit is connected to one or more different sensors in the vehicle, at least one of the sensors being a break-in detector for detecting tampering with the vehicle, and to a cellular antenna, and includes a controller for monitoring the sensor outputs and initiating an emergency message transmission to a remote monitoring station in the event of actuation of a sensor. The car processing unit monitors site identifying signals and signal strengths of transmissions from adjacent cellular transmitter sites in an emergency, and the emergency message includes vehicle identifying information, cell site identifying information, and signal strength information which will be dependent on distance from the cell site. The monitoring station includes a computer for determining and displaying an approximate vehicle location from the incoming cell site identifying and signal strength information.

16 Claims, 7 Drawing Sheets

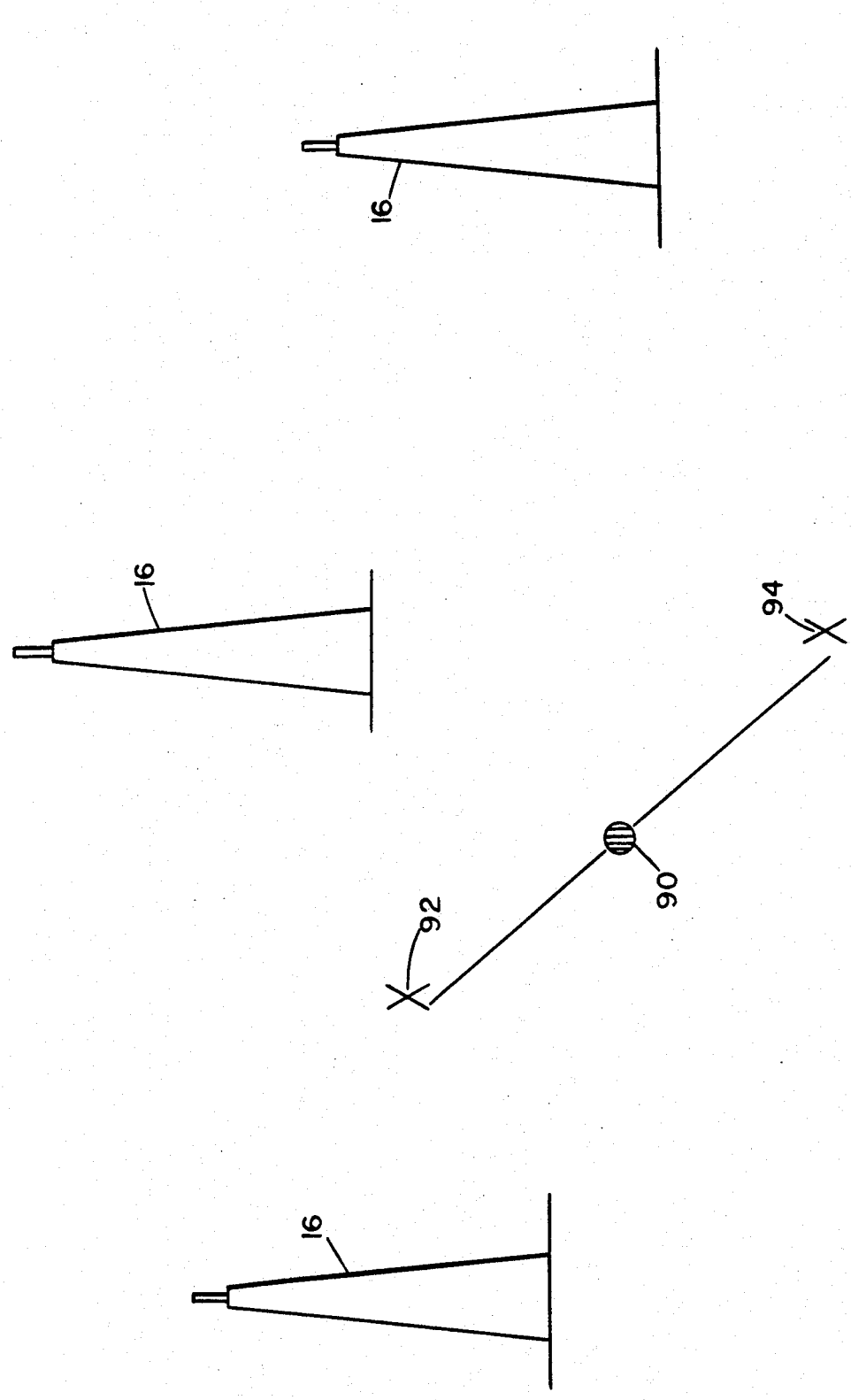

VEHICLE TRACKING SYSTEM

BACKGROUND OF THE INVENTION

The present invention relates generally to vehicle tracking and locating systems for locating vehicles in an emergency.

In U.S. Pat. Nos. 4,891,650 and 5,055,851 of Sheffer a vehicle locating system was described which relied on the use of the existing nationwide cellular radio network used in mobile telecommunications (cellular phone system). Cellular telephone networks rely on a fixed array of cell sites, each cell site covering a predetermined area and having a wireless signal detecting and generating unit at a central location in the area. These cell sites receive and transmit signals to and from cellular phones within their area on their own set of frequencies, and are linked via conventional land lines to a mobile telecommunication switching office (MTSO) for transmission to other cell sites, receivers, or conventional phones via a telephone company central office (CO).

U.S. Pat. Nos. 4,891,650 and 5,055,851 describe a system for detecting an emergency in a vehicle, such as forced entry, and using the existing cellular radio network to transmit an alarm signal from the vehicle to adjacent cell sites. The mobile telephone switching or MTSO is modified in order to transmit a signal indicating the signal strength of the received alarm signal to an external, to telephone company, central alarm station. The transmitted signal also includes vehicle identifying information. At the central alarm station, the approximate vehicle position can be estimated based on the relative strengths of the signal received from the vehicle at adjacent cell sites. A police car can then be dispatched towards the approximate vehicle location. The tracking vehicle turns on its own cellular car radio so that the tracking vehicle is itself tracked using the same technique. In this way, an operator in the central alarm monitoring station can observe the relative position of the original vehicle and the tracking vehicle or vehicles. Since the exact position of the tracking vehicle is known, this can be used to provide the tracking vehicle with instructions for moving towards the target.

One disadvantage of this previous vehicle location system is that it requires modification of the software at the MTSO so that it will generate the required signal strength signals for transmission to the central monitoring station. This would be a relatively complex and expensive procedure.

SUMMARY OF THE INVENTION

It is an object of the present invention to provide a new and improved vehicle tracking system for locating and tracking vehicles in emergency situations.

According to the present invention, a vehicle tracking system is provided which comprises a cellular processing unit for installation in a vehicle, a plurality of alarm sensors connected to the cellular unit, the sensors including break-in sensors for detecting an ignition start without the car key, towing or emergency panic switch, at least one cellular antenna connected to the cellular processing unit, and a remote alarm monitoring station including a computer connected to a central telephone network. The cellular processing unit mounted in the vehicle includes a controller for monitoring the output of the sensors and initiating an alarm sequence in the event of actuation of any one of the sensors, and a cellular transceiver for receiving cell identifying information and signal strength information from all adjacent fixed cellular phone sites in the vicinity when an alarm sequence is initiated, the controller being programmed to dial up a predetermined telephone number corresponding to the alarm monitoring station computer in the event of an alarm and to transmit a packet of information to the computer via an adjacent cellular phone site, MTSO and central telephone office. The packet of information includes an alarm code, vehicle identifying information, adjacent cell identifying information, and the relative signal strengths of signals received by the transceiver from adjacent cells. The computer at the alarm monitoring station is programmed to determine the actual cell site locations from the incoming cell identifying information, and to compute an approximate vehicle location from the cell relative signal strength information.

Preferably, the computer is programmed to display a map of the active cells region on a suitable display monitor linked to the computer and to indicate the computed vehicle location on the map in the form of a blinking colored dot or the like. According to a preferred embodiment of the invention, the system also includes similar cellular processing units for installation in field response unit (FRU) vehicles to be dispatched to the approximate vehicle location computed in the event of an emergency, and the computer is also programmed to compute the approximate locations of these FRU vehicles and display them on the map in the form of different colored dots. The actual location of the FRU vehicles can also be entered manually by the computer operator and compared to the computed locations in order to indicate a correction factor to be applied to the computed approximate location of the vehicle being sought, allowing the position to be continuously corrected as the FRU vehicles home in on the target.

The cellular processing unit installed in the vehicle is preferably similar to a conventional cellular telephone unit and includes all the circuitry necessary for operation as a conventional cellular phone. However, the circuitry is modified to enable the unit to monitor the sensors and prepare and send the alarm message if an alarm condition is detected. The unit includes a memory or monitoring unit connected to the alarm sensors, a central controller, and the transceiver for receiving incoming signals and for transmitting outgoing signals via the antenna. The controller is preferably linked to a conventional cellular phone handset for normal cellular phone communications. The unit is connected via a switching circuit to a power supply. Preferably, the unit is normally powered by the standard vehicle battery, but is also connected to a back-up battery for use in the event that the vehicle battery power is too low. The switching circuit is arranged to connect the memory unit to the power supply at all times, but connects the power supply to the remainder of the unit only while the ignition is on or when an alarm condition is detected. The memory unit is arranged to monitor the sensor outputs at all times and to connect the power supply to the remainder of the circuit if an alarm is detected while the ignition is off. Thus, break-in of a parked vehicle will initiate an alarm sequence. The controller is programmed to operate alternatively either as a standard cellular communication unit or to transmit alarm messages to a pre-programmed telephone number, and will disable the cellular handset while an alarm message is being transmitted.

This system allows a conventional cellular telephone network to be used as part of a vehicle tracking system in the event of an emergency, without any modification to the hardware or software of the existing cellular phone network being required. All that is necessary is to install the modified cellular processing units in all vehicles to be protected using this tracking system so that they can communicate with one or more alarm monitoring stations in the event of an emergency, the monitoring station computers being set up to track the vehicle and dispatch emergency response or FRU vehicles to the computed vehicle location. The system will be relatively inexpensive to set up and run, and will allow stolen vehicles to be found quickly and easily, providing a significant deterrent to theft. One of the sensors in the vehicle may be in the form of a panic button, for example, allowing the driver to initiate an alarm sequence in the event of a medical emergency or attempted vehicle hijack.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 9 is a schematic illustration of a final stage in the tracking process.

DESCRIPTION OF THE PREFERRED EMBODIMENT

Figure 1:
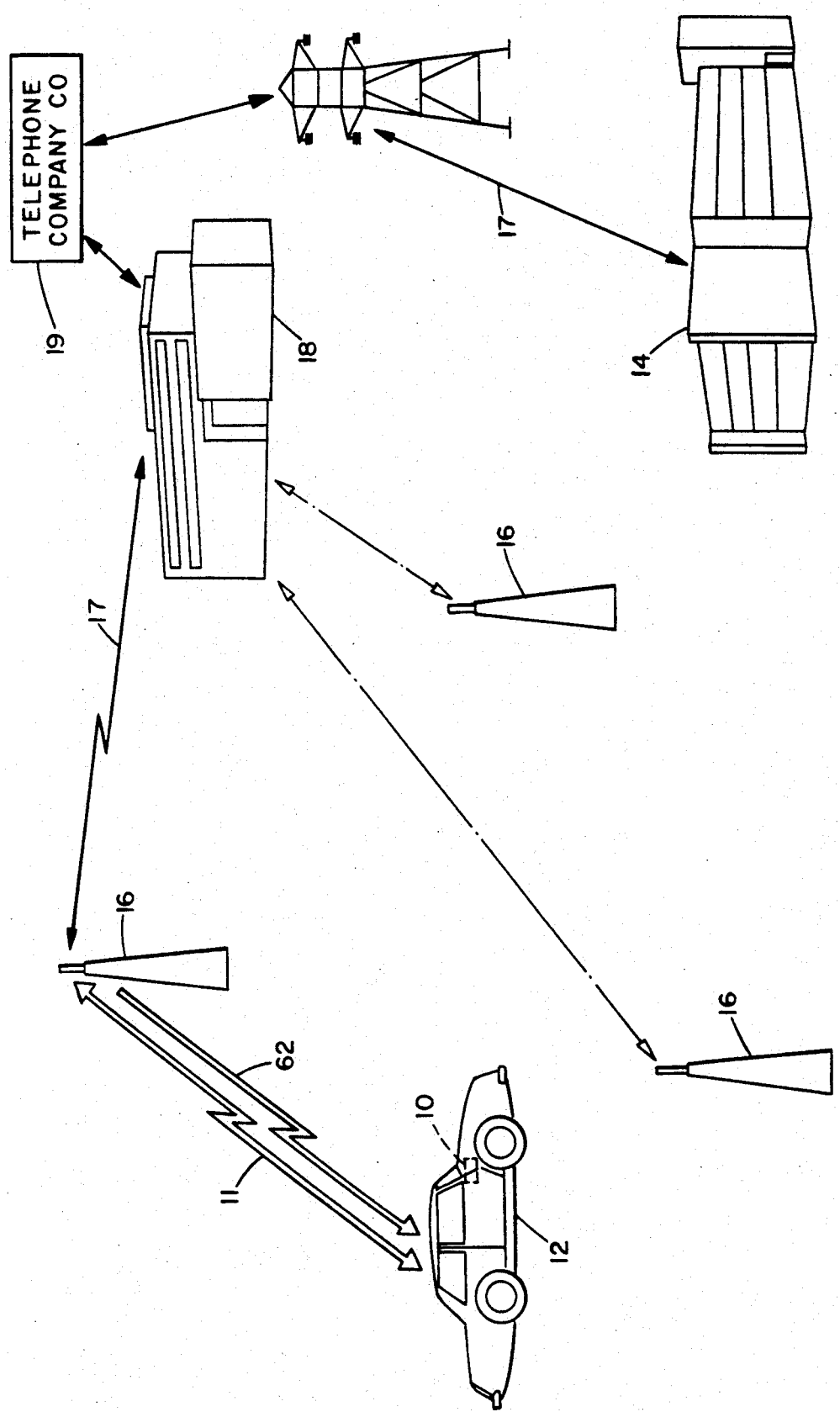
FIG. 1 is a schematic block diagram of a vehicle tracking system according to a preferred embodiment of the present invention.

A vehicle tracking system according to a preferred embodiment of the present invention is schematically illustrated in FIG. 1. The system basically comprises a cellular signal processing unit 10 mounted in a vehicle 12 and a central processing or monitoring station 14 for receiving alarm signals emitted from the processing unit 10 and computing an approximate vehicle position from those signals. The system makes use of the existing nationwide cellular telephone system consisting of a plurality of radio transmitters or cell sites 16 each covering a predetermined cell area. The cell sites 16 covering a predetermined region are linked to the MTSO 18 and to the telephone company central office or CO 19, as will be understood by those skilled in the field. Alarm signals 11 emitted from unit 10 are transmitted to the closest adjacent cell site 16 and relayed from there over conventional telephone lines or microwave link 17 through the MTSO station 18, CO 19 and to the central processing station 14, as will be explained in more detail below.

Figure 2:
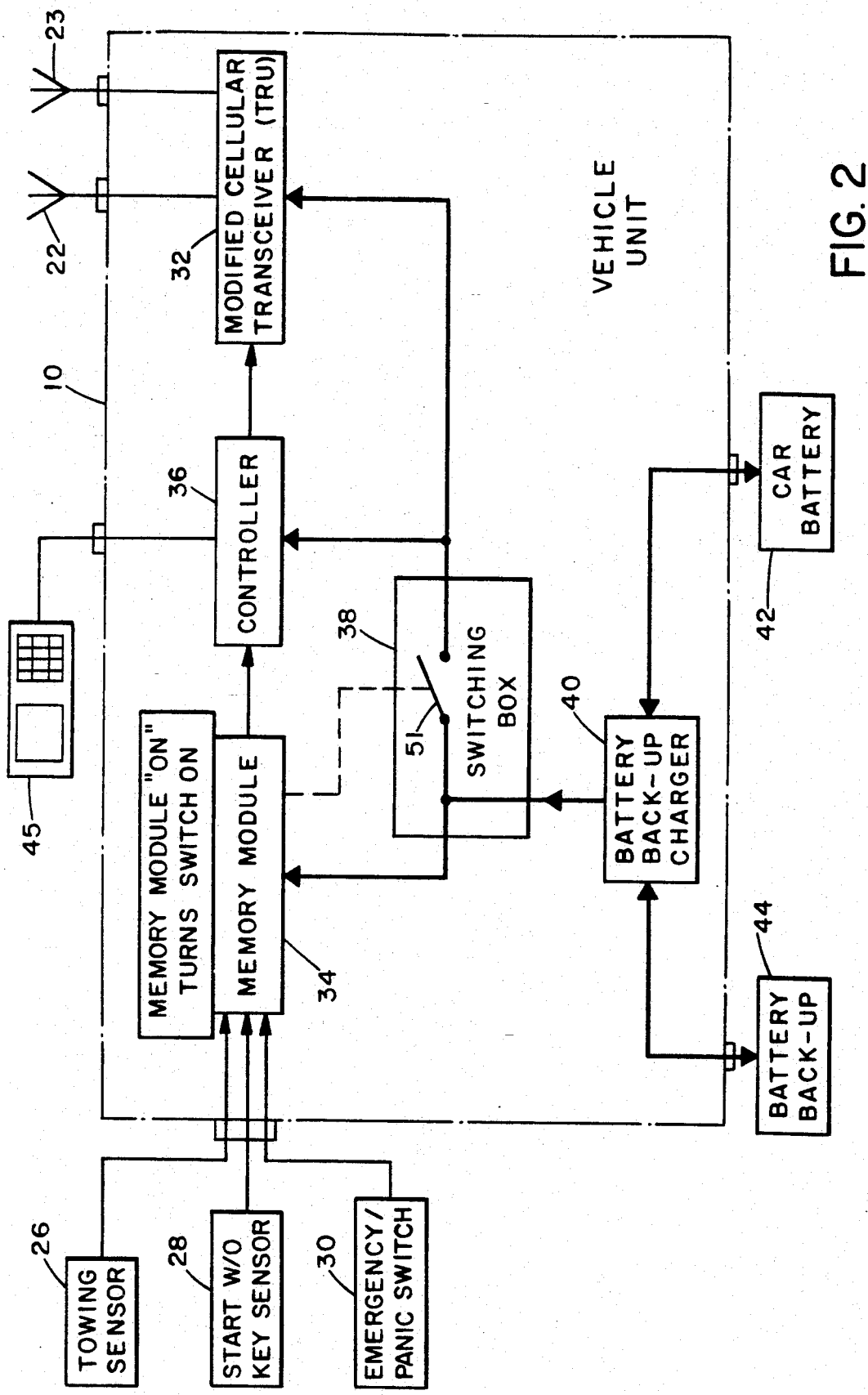
FIG. 2 is a block diagram of a cellular processing unit for installation in a vehicle.
Figure 3:
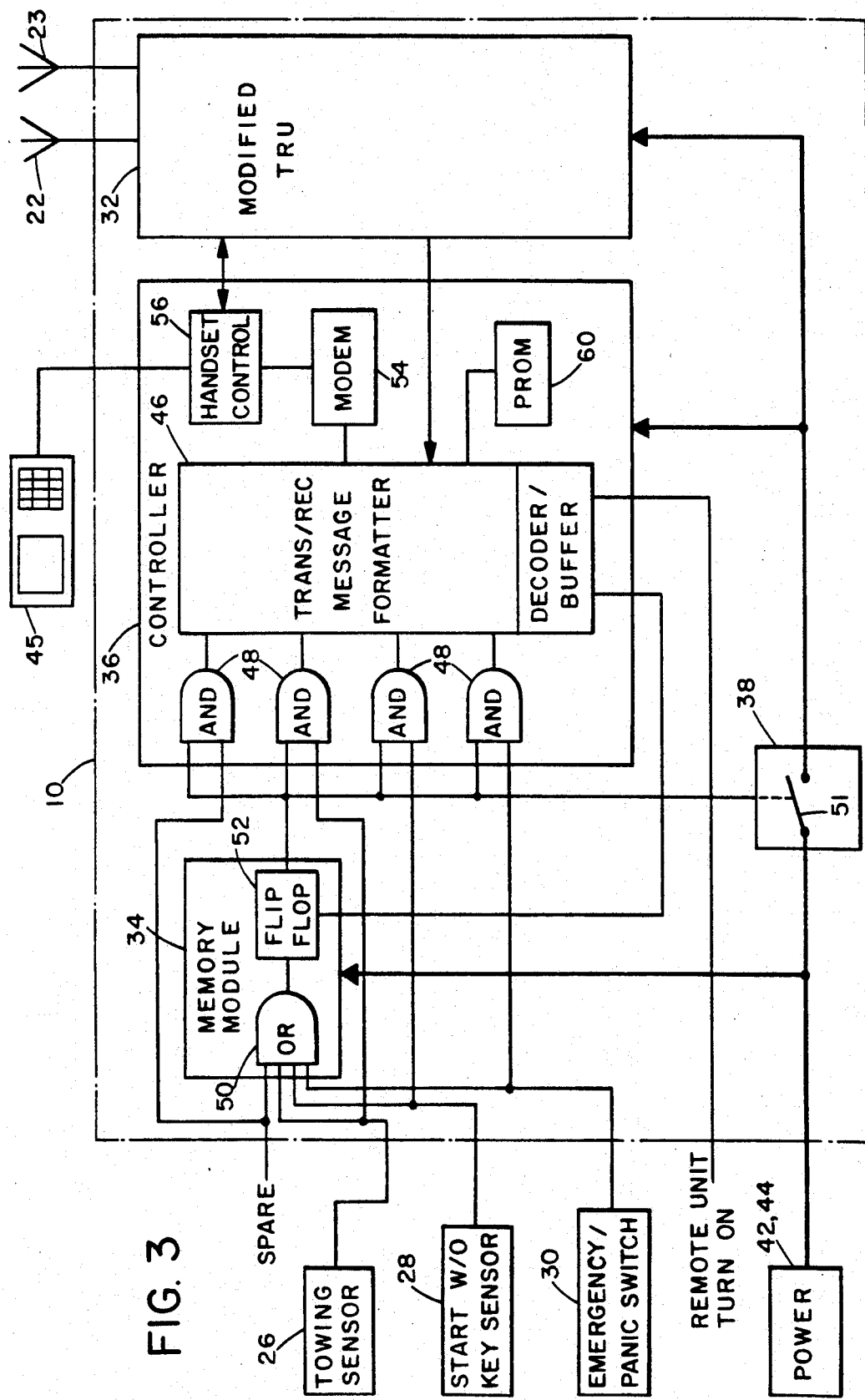
FIG. 3 is a more detailed circuit diagram of the unit of FIG. 2.
Figure 4:
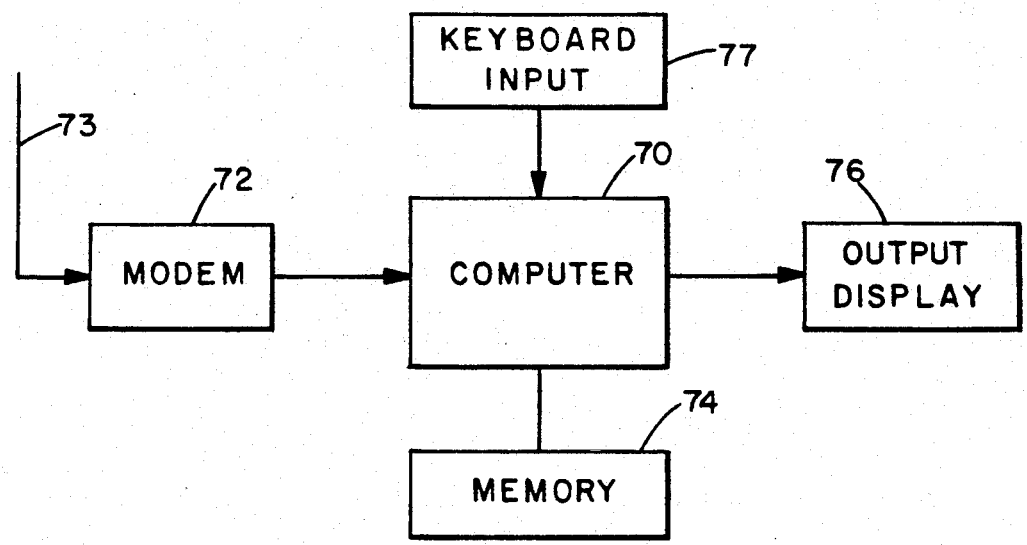
FIG. 4 is a schematic block diagram of a central monitoring station forming part of the system of FIG. 1.

The signal processing apparatus 10 for mounting in a vehicle is illustrated in more detail in FIGS. 2 and 3. The apparatus includes a modified cellular or transceiver phone-type unit 32 which is illustrated schematically in FIG. 2 and in more detail in FIG. 3. Unit 32 includes modified cellular phone circuitry as well as built-in alarm signal generating circuitry and software for generating an alarm signal in the event of an emergency. A pair of cellular antennas 22, 23 are mounted at different, hidden locations in the vehicle and linked to unit 10, along with a series of alarm sensors 26, 28, 30 of various types. For example, a sensor 28 may be provided to detect starting of the ignition without a key, while another sensor 26 may be arranged to detect towing. An emergency/panic switch 30 for actuation by the vehicle driver may also be provided as one of the alarm sensors. This may be provided as a push button on the cellular phone handset 45. Any conventional type of car break-in detector or sensor as used for actuating typical car alarms may be used in this system. The modified cellular phone unit is similar to a standard cellular phone unit and has all the necessary hardware and software for cellular phone communication purposes. However, the hardware and software is modified to enable the unit to additionally operate as an alarm unit in an emergency situation.

The vehicle unit includes the modified cellular transceiver 32 which is linked to the antennas 22 and 23 for receiving incoming radio signals from the antennas and transmitting alarm as well as standard cellular telephone signals via the antennas. The various sensors are linked to a memory unit 34 which is connected to central controller 36. The unit is connected via switch unit 38 and battery back-up charger 40 to both the car battery 42 and a back-up battery 44. Conventional cellular phone handset 45 is connected to the controller. Unit 10 is small enough to be mounted in a concealed location in a vehicle for added security.

The controller provides an interface between the alarm sensors and the transceiver, and is illustrated in more detail in FIG. 3. As illustrated in FIG. 3, the controller includes a transmit/receive message formatter 46 which has a series of inputs from AND gates 48. Each AND gate has one input connected directly to the output of a respective one of the sensors, and another input connected to the output of memory unit 34. The memory unit 34 comprises an OR gate 50 having inputs connected to all of the sensor outputs and output connected to the AND gates via "D" flip flop 52. The controller is connected via modem 54 and handset control 56 to cellular phone handset 45, which may be of a conventional type or may be modified to provide a "listen-in" feature in which emergency personnel can listen to the noises or voices in the vehicle in the event that the panic button is pressed. Some conventional cellular phone handsets have a "hands free" option which enables a driver to use the phone without holding the handset. This option consists of a built-in microphone and speaker. A handset having this option may be used, or an extra speaker/microphone may be built in to the vehicle, for example beneath the dashboard.

A PROM memory unit 60 linked to controller contains alarm information to be used in the event of an emergency, including a vehicle I.D. number, primary and secondary emergency phone numbers to be contacted in the event of an emergency, and other unit parameters.

When no alarm or emergency condition exists, the unit 10 can be operated conventionally as a cellular phone. The controller and modified cellular transceiver are similar to those used in conventional cellular phone units but are modified in order to respond to emergency indications from any of the sensors to generate and transmit an alarm signal to a predetermined telephone number to which the computer at the monitoring station is connected. The controller provides an exclusive OR condition between the cellular handset and the alarm signal transmission feature. Only one of these options can be used at a time. Thus, when an emergency situation is detected, the cellular handset enters a state where it is deactivated while the alarm signal is transmitted, to ensure that voice input will not interfere with the alarm transmission. However, the voice channel is shared between the on-going alarm data transmission and the voice signal. (In case of emergency/panic the driver would need to stay in voice contact with monitoring alarm station, even though the alarm data is continuously transmitted.) Once the alarm status is concluded, memory module 34 is deactivated and the cellular handset can be used for voice signal transmission only.

In a conventional cellular telephone network, all cell sites continuously transmit identifying signals 62 (see FIG. 1) containing information on the cell I.D., the control channel frequency, and the voice channel frequency and signal strength measurements of cell sites as sensed by a vehicle cellular phone. These signals can be picked up by mobile cellular phone units in the vicinity, so that a currently "active" cell is used for transmitting signals to and from the vehicle. In the modified cellular unit 10 of this invention, the transceiver is programmed to scan all control and voice channels of the adjacent cellular sites for their signal transmissions to obtain frequency channel identification, sectoring information, and signal strength, whenever an emergency sensor is activated. The two antennas are hidden at different locations in the vehicle, and the transceiver is programmed to take signal strength readings alternately from the two antennas. These readings are stored and subsequently compared, and the highest value readings are selected for transmission.

In the event that one of the sensors is activated, the controller determines which sensor the signal is received from, and obtains an alarm code corresponding to this sensor from memory 60. At the same time, the in-built modem or DTMF transmitter 54 automatically goes "Off-Hook" and the transceiver commences scanning all adjacent cellular sites, for their signal strength readings, selecting the highest value readings from readings from the two antennas. At this time, the controller initiates a dialing sequence to the appropriate telephone number, per the numbers stored in memory 60, to link up with the computer at the central monitoring station. In conjunction with the controller, the transceiver transmits an alarm message or packet of information to the central computer. This packet is continuously updated and transmitted at periodic intervals to the telephone number as long as the alarm condition exists. The telephone number dialed automatically corresponds to the computer installed at the central monitoring station. The packet of information will include the type of alarm code, the vehicle i.d., other vehicle identifying information, and the frequency channel information sectoring information, and signal strength information received from all the adjacent cell sites. The data communications between the vehicle unit and the computer at the monitoring station use conventional modem to modem communication with a reliable communication protocol.

The vehicle unit 10 is powered by the car battery 42 with the back-up battery 44 providing fall-back power should the car battery be out of commission. The memory circuit 34 is the only part of the unit which is continuously powered up, even when the car ignition is off, as indicated in FIG. 2. This circuit continuously monitors the sensors for an alarm output, and triggers the switching box and consequently the rest of the circuit to become operational in the event of an alarm detection. Since this part of the unit will draw power even when the car is stationary and the car battery 42 is not being recharged, it must draw extremely low current. As illustrated in FIG. 3, when any of the sensors is actuated, the output of OR gate 50 will be positive, operating the flip-flop device to close the switch 51 in unit 38 and connect the remainder of the circuit to the power supply. Additionally, switching box 38 will be on whenever the ignition is on and the cellular phone is on.

The central monitoring station will now be described in more detail with reference to FIGS. 4-8. The station includes a computer 70 connected via modem 72 to the telephone line 73. The computer 70 has a memory 74 which includes stored information on customers and vehicle i.d. numbers, as well as cell site information including cell frequency and sectoring information and respective metro areas digital maps, or any other maps replicating the true nature of roads, landmarks and other significant items. The computer is linked to a suitable output video monitor 76, which preferably includes a standard display as well as a digital map display, and has operator input via keypad unit 77. The computer is suitably programmed to respond to incoming alarm signals and accompanying information packets by computing an approximate vehicle position, as will be explained in more detail below with reference to FIGS. 6-8.

Additionally, in a preferred embodiment of the invention, the computer operator is able to listen to the sounds inside the vehicle once the alarm has been activated, and may also talk to the vehicle occupants, if desired, via the speaker/microphone installed in the cellular phone handset or elsewhere in the vehicle which is automatically activated on detection of an alarm condition and receipt of a command signal from the monitoring station. As noted above, the cellular handset is deactivated while the alarm information is being transmitted. If the operator at the remote monitoring station now dials the phone number of that cellular phone unit, they will be able to listen to the voices in the vehicle and also talk to the vehicle's occupants if desired. This feature is particularly useful where the driver of the vehicle has activated a manually operated panic button on the cellular phone handset or on front panel of the vehicle, for example. The operator can determine what type of emergency has occurred and can dispatch the appropriate emergency response vehicle.

Figure 5:
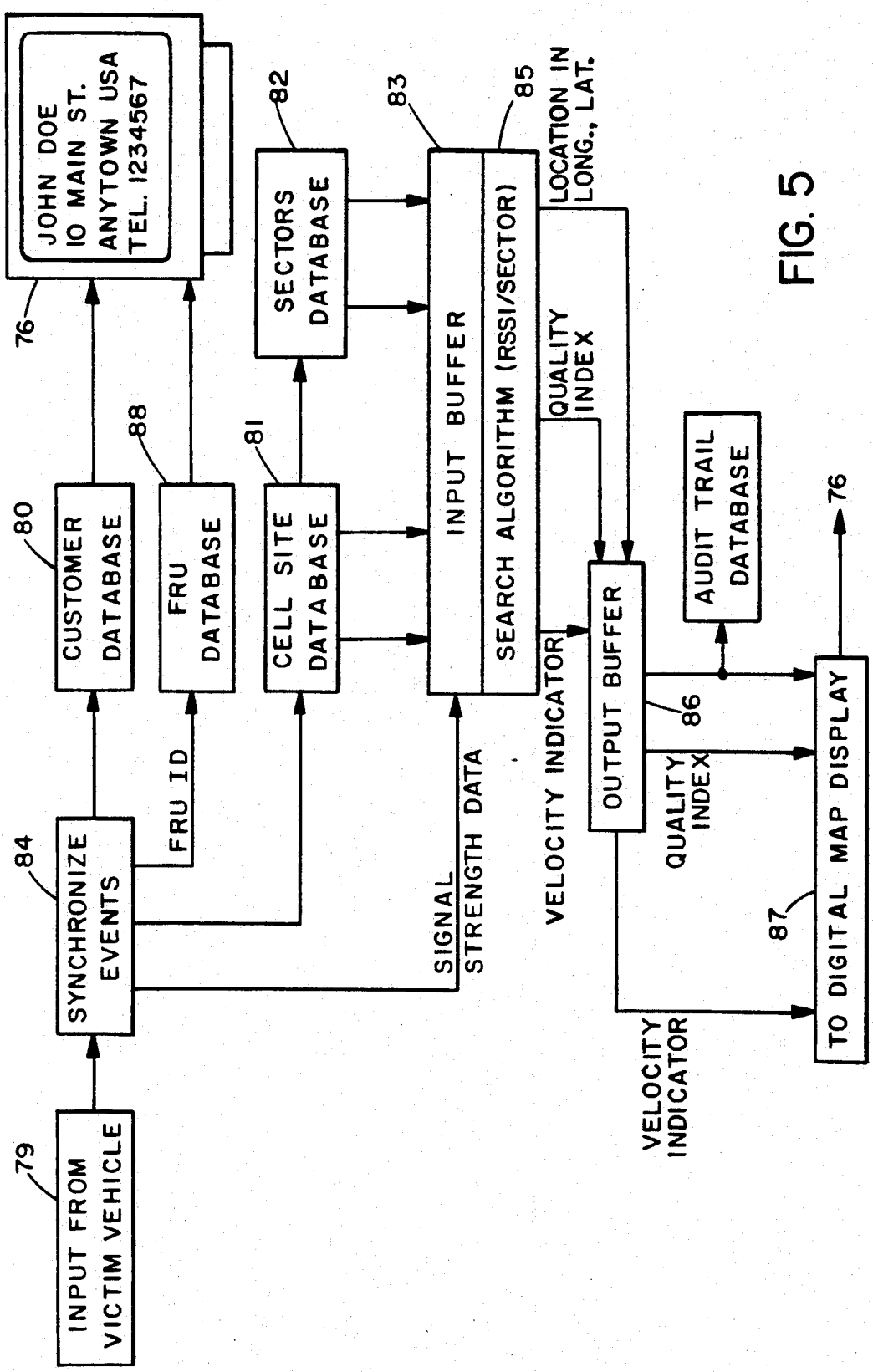
FIG. 5 is a schematic block diagram of the configuration and information flow in the central monitoring station computer.

FIG. 5 illustrates the schematic configuration and information flow in computer 70 on receipt of an incoming information packet 79 from a vehicle unit in which an emergency situation has occurred and been detected.

All incoming alarm signals are first displayed on the monitor 76 and stored in a buffer memory area 83 in the computer. If more than one alarm is present, the operator selects the alarm having the highest priority for processing. The computer includes several databases 80, 81, 82 containing information on customers, cell site locations, and cell sector information, respectively. When an incoming information packet is received, the information is synchronized (84) and customer database 80 is searched based on the vehicle i.d. The cell site and sector. information databases are searched to determine the adjacent cell locations from the incoming cell information. The cell and active cell sector determined from the database are input along with the signal strength levels to a temporary input buffer memory 83, and then the information is processed at 85 in accordance to stored program instructions to determine the vehicle location as a longitude and latitude. The approximate vehicle location is transmitted via output buffer 86 to a digital map display 87 on output screen 76. The computer also includes a field response unit FRU database 88 for storing identifying information on FRU vehicles which are dispatched to the computed vehicle location.

The computer is programmed to display a map of the geographical area corresponding to the detected cell site information, and also displays in a window on the screen a text display of the vehicle i.d. and information on the vehicle owner and vehicle to aid in subsequent mobile unit tracking. This information will include vehicle type and color, vehicle plate number and identification number, and the owner's name and address. This information forms part of the alarm information packet transmitted from the vehicle. The computer is also programmed to compute an approximate vehicle location from the incoming cell site signal strength and identifying information, and this approximate location is displayed on the map as a blinking red spot or circle, for example. The information is continuously updated based on incoming information from the vehicle, and the map is moved to a new area as necessary.

Figure 6:
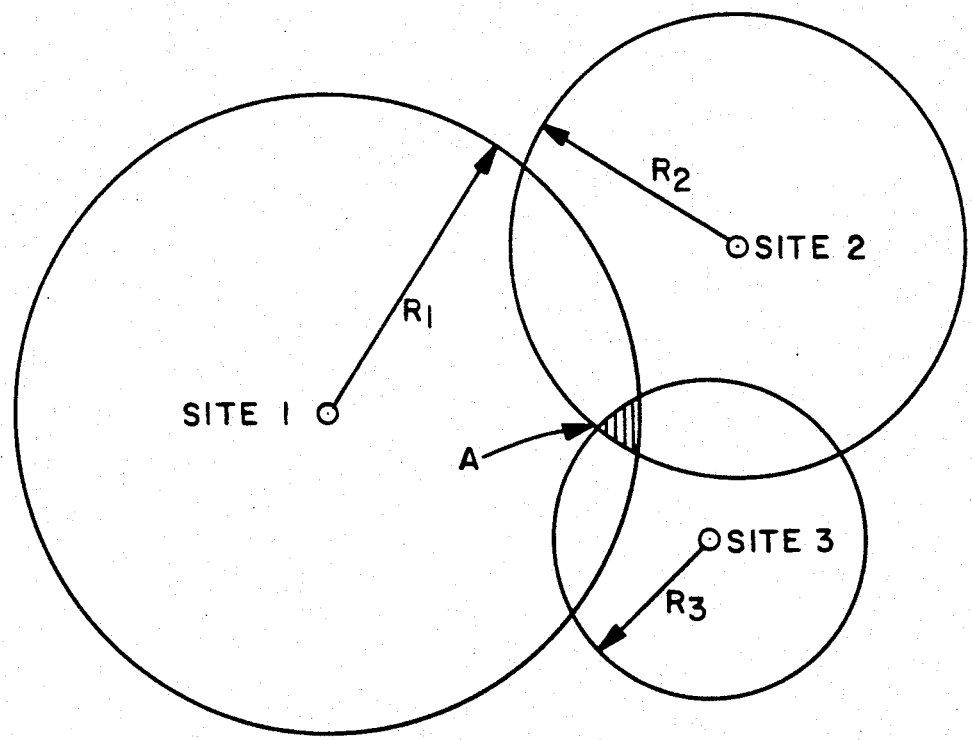
FIG. 6 illustrates a vehicle unit location in the vicinity of three fixed cell sites and graphically illustrates a triangulation process for estimating the vehicle position.
Figure 7:
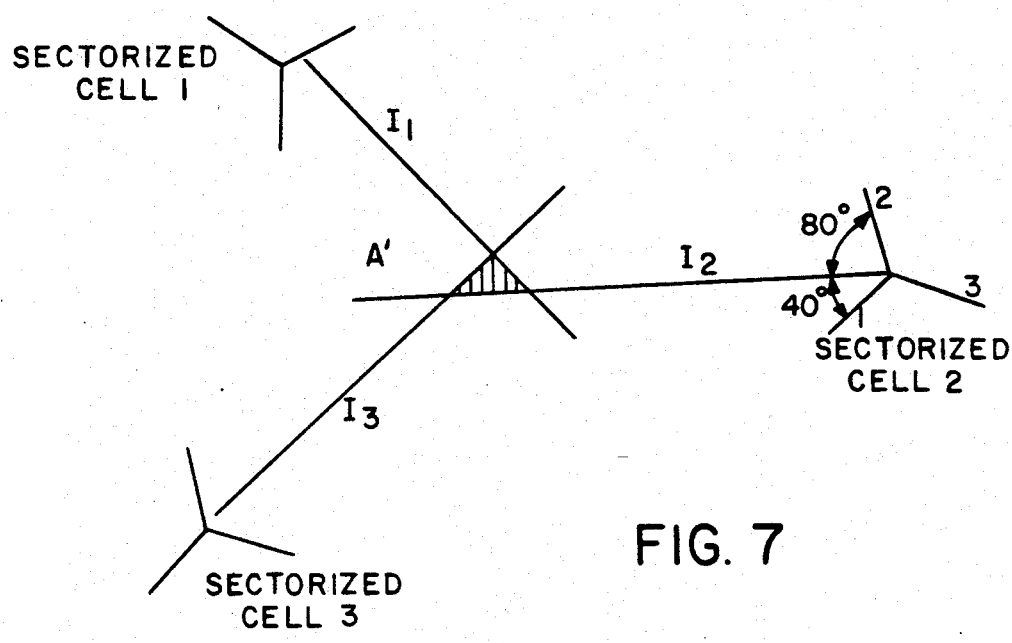
FIG. 7 graphically illustrates a sectoring computation for estimating vehicle position.
Figure 8:
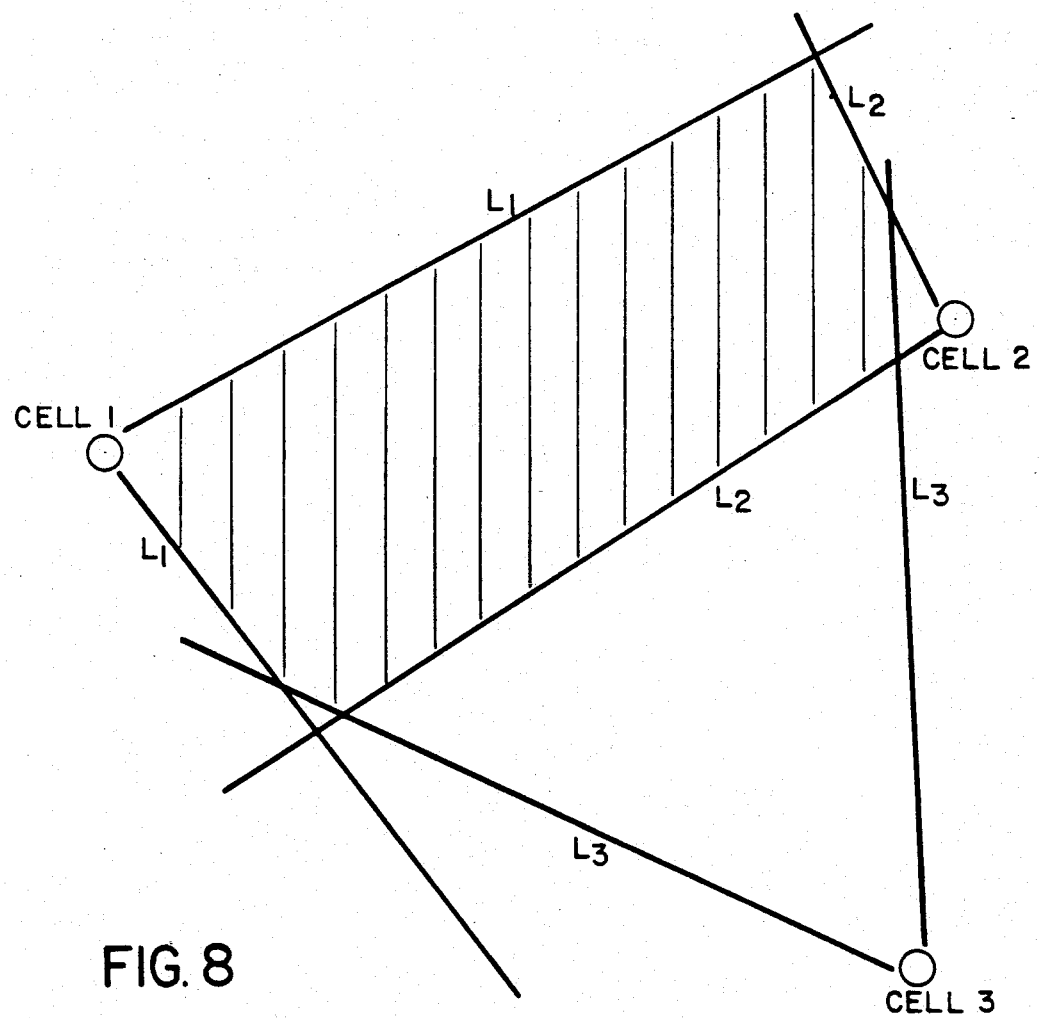
FIG. 8 schematically illustrates cell sector border lines for three adjacent cells.

FIGS. 6-8 illustrate schematically the procedure used by the computer to estimate vehicle position. As illustrated in FIG. 6, the received signal strength indicator SS of respective cell sites 1, 2 and 3 may be used as the basis of a triangulation algorithm to find the approximate location of the vehicle. Due to the nature of the actual propagation contours, which will not normally be a straight line due to ground contour variations, it will be impossible to get an accurate indication of the vehicle position using only this technique. However, it does allow the approximate position of the vehicle to be estimated, enabling emergency vehicles or field response units to be dispatched to the approximated area. The triangulation calculation is based on the fact that the approximate distance of the vehicle from any cell site can be calculated from the signal strength of the signal received by the vehicle from that site. Thus, the vehicle will be in a circle of radius equal to the distance calculated based on the received signal strength. If circles are drawn from three adjacent cell sites, as illustrated in FIG. 6, the vehicle is likely to be in the area A where the circles overlap. The approximate vehicle position is estimated from the following relationship:

$$\frac{SS_1}{SS_2} = \frac{K}{r_1^4} \times \frac{r_2^4}{K} \text{ or } \frac{r_2}{r_1} = \sqrt[4]{\frac{SS_1}{SS_2}}, \quad (1)$$

where r is the circle radius, SS is the signal strength, and K is a constant. Based on this relationship, all r's can be expressed in terms of $r_1$. $r_1$ is first assumed to be small, and is then incremented until all the r's meet, at which point the calculation is stopped. At this point, A will be at its smallest value. The same technique can be used for any number of cell sites, or r's.

Since this procedure only provides an approximate vehicle location, the position is further refined using sectoring information, as illustrated in FIG. 7. Transmitted data from the vehicle unit includes identification of the voice frequency channel of each detected cell site, and the actual cell sites can therefore be determined from the information stored in the computer's memory. Each cell site is divided into sectors, as illustrated in FIG. 7, and each sector has an antenna pattern overlapping the antenna patterns of adjacent sectors. The information transmitted from the vehicle will also include the sector information, in other words identifying the particular sector of that cell in which the vehicle is located. Once the sector is identified, its directional information relative to the local terrain is known. The relative signal strengths from different sectors surrounding the victim vehicle can therefore be used to further refine the vehicle position. If signals from two different sectors of a particular cell site are detected, for example, an imaginary line I can be drawn between the two sectors based on the relative signal strengths between those sectors, as illustrated in FIG. 7, based on the following relationship:

$$I = B \times \left(1 - \frac{S1}{S2 + S1}\right) \quad (2)$$

where I is the direction to the vehicle, B is the "in-between" angle between the adjacent sectors, S1 is the strong sector signal strength, and S2 is the weak sector signal strength.

For example, considering sectorized cell 2 in FIG. 7, assume that the signals received from sectors 1 and 2 of cell 2 have intensities of 10 and 5, respectively. The vehicle is therefore more aligned with the main lobe of sector 1. If the angle between the sectors is 120°, the imaginary line is drawn at 40° to the dividing line between the sectors.

Imaginary lines are drawn in this way from all of the detected cell sectors, and these lines intersect to form an imaginary area $A^1$. If this corresponds to the area A found by the triangulation algorithm, the search for the approximate vehicle location is concluded. This calculation assumes that the vehicle receives more than one sector signal strength per cell site. If only one sector signal strength is received per cell site, the intersection of this sector beam width with the other sector site borders forms an approximate search area B, as illustrated in FIG. 8, where lines L are the sector information border lines. Where no sectorized cell information is available, the initial position calculated by triangulation is used.

Once the approximate vehicle position has been computed and displayed on the screen, an operator or dispatcher at the central monitoring station dispatches one or more emergency vehicles or FRUs towards the estimated location. Each of the FRU vehicles will have a cellular signal processing unit identical to that in the vehicle being tracked. In FIG. 9, the estimated vehicle location computed at the monitoring station is at 90, while 92 is the actual vehicle location. When a dispatched vehicle or FRU reaches the approximate location 90, the processing unit in the FRU will transmit an information package to the central computer in an identical manner, from which the position of the chasing vehicle can be estimated and displayed at 94 on the screen as a different color dot. At the same time, the driver of the dispatched vehicle or FRU contacts the operator by cellular phone and gives them the actual position, which the operator enters on the screen at 90 for comparison with the computed position. The distance discrepancy between the FRU vehicle actual and computed positions 90 and 94 is used to adjust the victim vehicle position, as illustrated in FIG. 9, to a corrected position 92 based on the discrepancy between the calculated and actual positions of the dispatched or reference vehicle. The corrected victim vehicle position is then displayed and the chasing vehicle is directed to the corrected position. This correction process continues throughout the chase until the vehicle is actually located. Alternatively, or in addition to the above, the FRU vehicle can be equipped with conventional direction finding equipment. When the FRU is dispatched to point 90 in FIG. 9 it will turn on its direction finder to locate the stolen vehicle at 92. The direction finder indicates relative signal strength and direction at a resolution of ±5°. A tracking can be terminated with an appropriate command entered on the cellular handset in the vehicle itself, or entered in the computer at the remote monitoring station.

This system provides considerable security against theft and other emergency situations and can be easily and inexpensively installed in any vehicle, making use of the existing cellular telephone network. The processing unit installed in the vehicle is capable of receiving incoming signals from existing cellular phone system transmitter sites surrounding the vehicle, decoding the signals, and transmitting the decoded signals along with the alarm information to a monitoring computer at a remote site where an approximate vehicle location can be computed from the received signals from adjacent cellular transmitter sites. This requires absolutely no modification to the existing cellular telephone network, and so it is inexpensive and convenient to install.

The vehicle unit is set up to make disabling or tampering difficult. Removal of the car battery or cellular phone handset does not disrupt alarm information transmission to the monitoring station. Two separate cellular antennas are used, so that removal of one antenna will also not disrupt the tracking system. The use of two antennas also allows the system to monitor input from both antennas and to select only the antenna which is currently receiving the best signal for use in emergency or alarm information transmitted to the monitoring station. This two-antenna arrangement ensures omni-directional characteristics or equal sensitivity of 360° in multi-direction detection of signal strength without degradation. Hiding antennas inside the vehicle generally tends to degrade the omni-directivity characteristics of the cellular antenna. However, by using two antennas and selecting the best signal between the antennas, omni-directional signal detection characteristics can be maintained. The vehicle unit is set up to draw only low current when the vehicle ignition is off and the car battery is not being recharged.

Although a preferred embodiment of the invention has been described above by way of example only, it will be understood by those skilled in the field that modifications may be made to the disclosed embodiment without departing from the scope of the invention which is defined in the appended claims.

We claim:

1. A vehicle tracking system, comprising:
an array of fixed cellular signal receiving and transmitting units each covering a predetermined area and forming part of a cellular telephone network, each fixed cellular unit including means for transmitting cellular voice and control channel signals identifying said unit;
a signal processing unit for mounting in a vehicle, the unit including signal generating means for generating emergency signals on detection of an emergency condition, the signal generating means including means for continuously scanning all voice and control channel signals from any fixed cellular units within range of the vehicle during an emergency condition, means for determining the signal strengths of any received cellular voice and control signals, and means for transmitting an emergency signal from the vehicle for each set of received signals, each emergency signal including the received cellular control signals and determined signal strengths; and
a central monitoring means for receiving said emergency signals and for computing an approximate vehicle location from said cellular control signals and signal strengths.

2. The system as claimed in claim 1, further including sensor means linked to said signal processing means for detecting an emergency in said vehicle, said signal processing means including means for monitoring the output of said sensor means and operating said emergency signal generating means on actuation of said sensor means.

3. The system as claimed in claim 1, wherein said emergency signal includes vehicle identifying information.

4. The system as claimed in claim 1, including a telecommunications switching office connected to said fixed cellular units, said central monitoring means being coupled to said telecommunications switching office, and said transmitting means comprising means for transmitting said emergency signal to said central monitoring means via one of said fixed cellular units and said telecommunications switching office.

5. The system as claimed in claim 1, wherein said signal receiving and transmitting means comprises a cellular transceiver and at least one cellular antenna connected to said transceiver.

6. The system as claimed in claim 5, including a pair of cellular antennas connected to said transceiver, and control means for alternately receiving incoming signals from adjacent cell sites from the two antennas and for comparing said signals and transmitting the strongest set of signals in said alarm message for ensuring omni-directional reception of signal strength from all adjacent cell sites.

7. The system as claimed in claim 1, wherein said central monitoring means includes a computer, connecting means for connecting the computer to receive incoming alarm signals via a telephone line, and display means for displaying output information from said computer, the computer including means for receiving and storing incoming alarm messages, means for displaying vehicle identifying information on said display means in response to an incoming alarm signal means for computing an approximate vehicle location from the incoming alarm signal information on adjacent cellular transmitter units and signal strengths, and means for displaying the computed vehicle location on the display means.

8. The system as claimed in claim 1, including a plurality of identical signal processing units mounted in vehicles to be monitored and in tracking vehicles for tracking said monitored vehicles, the central monitoring means including means for receiving incoming alarm information signals from processing units in a first vehicle being tracked and in tracking vehicles chasing that vehicle and for computing approximate vehicle locations for the first vehicle and the tracking vehicles, and for comparing the computed tracking vehicle locations to the actual tracking vehicle locations and correcting the first vehicle location in accordance with any discrepancy between the computed and actual tracking vehicle locations.

9. The system as claimed in claim 1, wherein the central control station processing means includes means for determining the area covered by the fixed cellular units detected by the signal processing unit, means for displaying a map of the determined area and for displaying a computed vehicle location at the appropriate position on the map, and for up-dating the displayed vehicle location in response to incoming cell identifying and signal strength information from the vehicle.

10. The system as claimed in claim 2, wherein the sensor means includes a towing sensor for detecting towing of the vehicle, a sensor for detecting start of the vehicle without use of an ignition key, and an emergency button for operation by the driver of the vehicle.

11. The system as claimed in claim 10, wherein said cellular processing unit includes a power input, monitoring means connected to said sensors and having an output connected to said signal generating means, said monitoring means being connected to said power input at all times, and switching means connected between said power input and said signal generating means, said switching means comprising means for normally disconnecting said signal generating means from said power input when the vehicle ignition is off and for connecting the signal generating means to the power input when the ignition is on, and said monitoring means comprising means for operating said switching means to connect said signal generating means to the power input on actuation of any of said sensors while the vehicle ignition is off.

12. The system as claimed in claim 1, including a pair of alternative power inputs to said unit, the first input comprising means for connection to a vehicle battery output, and a back-up battery connected to the other power input for supplying power to the unit in the event of loss of vehicle battery power.

13. The system as claimed in claim 1, wherein said signal generating means comprises a transceiver for receiving and transmitting cellular radio signals, and a controller for controlling said transceiver to transmit said alarm message in the event of an emergency.

14. The system as claimed in claim 13, including microphone and speaker means connected to said controller, the controller including means for activating said microphone and speaker means in the event of receipt of a listen-in command from said central monitoring means to allow an operator at said central monitoring means to listen to sounds in the vehicle, the central monitoring means including means for dialing up said vehicle unit and transmitting said listen-in command to said unit on receipt of a selected control input from said operator.

15. A method of locating and tracking a vehicle, comprising the steps of:
installing a modified cellular phone unit in a vehicle including means for detecting an emergency situation in the vehicle and means for generating and transmitting a sequence of emergency signals at periodic intervals after detection of an emergency situation while the emergency situation exists, the cellular phone unit being usable as a standard cellular phone during non-emergency conditions;
detecting an emergency situation in the vehicle;
continuously monitoring and scanning the cell voice and control channel identifying information transmitted from cellular phone network cell sites within range of the vehicle in the cellular phone unit in the vehicle while the emergency situation exists;
extracting and storing signal strength data in the vehicle unit from the signals received from adjacent cell sites during each scan;
continuously updating the stored signal strength data using the continuously scanned voice and control channel signals during the emergency situation;
transmitting emergency signals at predetermined intervals from the vehicle unit to a central controller at a remote monitoring station during the emergency situation, each emergency signal including an alarm code, vehicle identifying information, and cell identifying and signal strength information generated from the stored signal strength data; and
processing the alarm information at the central computer to compute an approximate vehicle location from the cell identifying and relative signal strength data.

16. The system as claimed in claim 1, wherein the signal processing unit comprises a modified standard vehicle cellular phone unit.

* * * * *